US00RE35719E

United States Patent [19]

Lesser et al.

[11] E Patent Number: Re. 35,719

[45] Reissued Date of Patent: Feb. 3, 1998

[54] HOLDING DEVICE FOR VERTICALLY POSITIONING A WINDOW PANE

[75] Inventors: Hans-Jürgen Lesser, Rheinfelden; Karl-Heinz Schweizer, Lorrach-Brombach, both of Germany

[73] Assignee: A. Raymond KG, Lorrach, Germany

[21] Appl. No.: 455,032

[22] Filed: May 31, 1995

Related U.S. Patent Documents

Reissue of:

[64] Patent No.: 5,214,824
Issued: Jun. 1, 1993
Appl. No.: 837,392
Filed: Feb. 19, 1992

[30] Foreign Application Priority Data

Feb. 19, 1991 [DE] Germany ..... 41 05 023.1

[51] Int. Cl.[6] ..... E05D 1/02; B60J 10/00; E06B 3/64

[52] U.S. Cl. ..... 16/225; 269/104; 16/220

[58] Field of Search ..... 16/220, 225, 1 R; 269/104, 266, 901, 902, 909, 297–299; 248/244, 544, 573

[56] References Cited

U.S. PATENT DOCUMENTS 3,836,118 9/1974 Meyer ..... 269/104

FOREIGN PATENT DOCUMENTS

230837 B1 12/1989 European Pat. Off. ..... 269/104

*Primary Examiner*—Chuck Y. Mah
*Assistant Examiner*—Donald M. Gurley
*Attorney, Agent, or Firm*—Finnegan, Henderson, Farabow, Garrett & Dunner

[57] ABSTRACT

A holding device for vertically positioning a windshield or rear window so that it can be bonded into the frame of a motor vehicle. It has a holding part which can be inserted into a lower transverse part of the frame and a series of support steps transversely spaced from one another in a direction parallel to the transverse part of the frame and pivotally connected to the holding part so that they can individually and elastically pivot out to a holding position or be pressed into an out-of-the way position. The steps each have a support face, the faces being arranged in step wise fashion at an equal vertical distance from each other.

20 Claims, 3 Drawing Sheets

HOLDING DEVICE FOR VERTICALLY POSITIONING A WINDOW PANE

Matter enclosed in heavy brackets [ ] appears in the original patent but forms no part of this reissue specification; matter printed in italics indicates the additions made by reissue.

BACKGROUND OF THE INVENTION

This invention relates to a holding device for vertically positioning a window pane, which can be bonded the frame of a motor vehicle.

Stick-on window panes, such as for example windshields, are usually inserted automatically with a free arm robot. In this case, the panes must be located at a constant distance from the window frame and positioned by means of holding devices until the adhesive sets. For vehicle body construction, holding devices with automatic adjustment of the support elements to the respective height of the lower edge of the window pane have been used to an increasing degree in addition to holding devices with manually adjustable support faces.

This invention is based on a holding device of the type disclosed in published European Patent Application No. 0 230 837 B1. In this device, support bars are arranged at small intervals one above the other and are integrally connected to a holding part by means of elastically compressible spring legs. After the window pane has been placed in the desired position, its lower edge rests on the support bar located immediately below it, whereas the support bars located above the edge are pressed in to an out-of-the-way position by the window pane.

However, when the window pane is placed in position by a robot arm, deviations in tolerance with respect to the window frame frequently result which have to be compensated for by a readjustment of the window pane after it has already been pressed onto the adhesive material. This requires a subsequent displacement of the window pane in the installation plane, in which case the upper edge of the window pane has to be aligned with the upper transverse frame to a specific prescribed degree.

In the known holding device, a downward compensation movement is possible by manually pressing in the bars which are supporting the pane. On the other hand, if an upward compensation movement of the window pane is required, the last support bar that has been pressed in by the edge of the window pane will spring back as the pane is raised due to the restoring force of its spring legs, and thus support the window pane at a new level.

However, this holding device has various disadvantages which have prevented motor vehicle manufacturers from generally using them for the temporary positioning of windshields. First, the thickness of the support bars, which is required for structural reasons, results in an excessively large gradation between the individual support faces. Secondly, a specific spacing exists between the individual support bars for technical reasons associated with their removal from molds, which spacing will allow compression of the bars by the window pane being supported before the supporting effect of the holding device can be achieved. The higher the position at which the lower edge of the window pane is to be placed, the more support bars that have to be compressed onto one another and thus the further the window pane will slip downwards until all the bars are lying securely on top of one another. Thus, the positioning is too inaccurate for practical application. Finally, this holding device cannot be injection molded in a simple two-part casting mold, but instead requires a separate mold-removal slide in order to be able to remove from the mold the intermediate space between the laterally bent spring legs, which necessarily raises manufacturing costs.

In view of the requirements placed on the holding device and in view of the fact that its support function is only required temporarily until the bonding process is completed, an object of the present invention is to design the holding device in such a way that finer gradation is achieved between the individual support faces and the support faces are largely prevented from giving way when loaded by the window pane. In addition, the manufacturing costs are to be kept as low as possible.

SUMMARY OF THE INVENTION

This object is achieved in accordance with the present invention, by providing a holding device for vertically positioning a window pane in the window frame of a motor vehicle to allow it to be bonded thereto, comprising a holding part adapted to be inserted into a lower horizontal part of the frame and a plurality of support steps transversely spaced in a direction parallel to said frame part, each of said steps being integrally connected to the holding part by a flexible connecting web permitting the steps to pivot between a holding position where they extend forward of the holding part and an out-of-the-way position where they are located in a recess in said holding part, said steps being resiliently biased toward the holding position and each having an upper support face for supporting a lower edge of said window pane when in the holding position, the support faces of the steps being vertically spaced from each other an equal distance and a lower stop face that engages with a support cam on the holding part to support the step in its holding position.

BRIEF DESCRIPTION OF THE INVENTION

Further advantages of the invention will be seen in the exemplary embodiments of the invention as shown in the drawings in which.

DETAILED DESCRIPTION OF THE INVENTION

Figure 1:
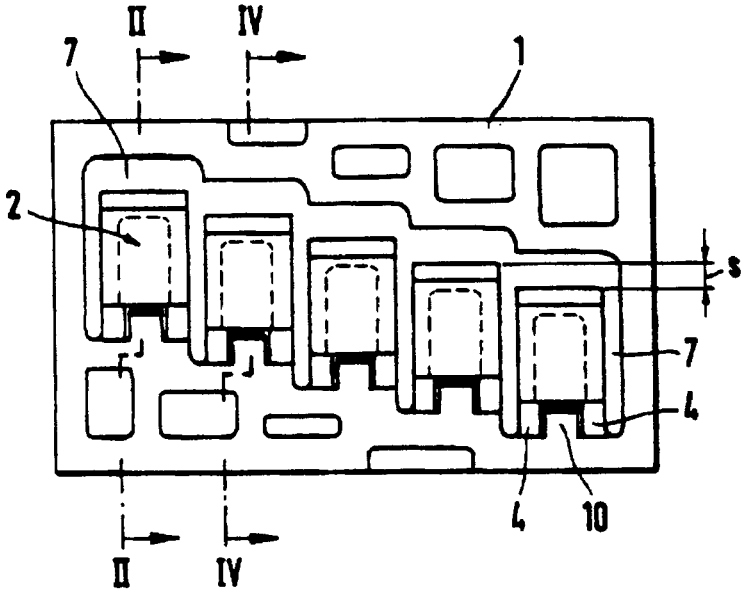
FIG. 1 is a front view of the holding device of the present invention with 5 support steps.
Figure 2:
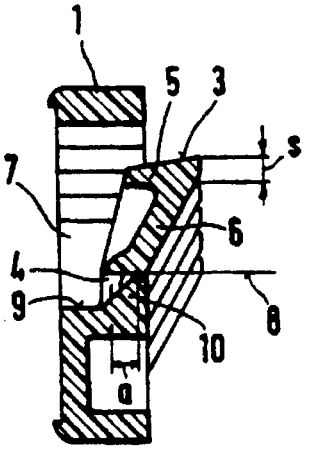
FIG. 2 is a sectional view of the holding device of FIG. 1 taken through the top support step and along the line II—II in FIG. 1.

The holding device shown in the drawings serves to vertically position glass window panes, such as windshields or rear windows, in the window frames of a motor vehicle, the holding function only being required until the bonding connection between window pane and window frame is complete.

For this purpose, the holding device consists of an essentially rectangular holding part 1, which can be inserted into the lower transverse part 11 of the window frame of the vehicle, and a number of support steps 2 having support faces 3 spaced at an equal distance "s" from each other. Support steps 2 are arranged next to one another in a direction parallel to the transverse frame part 11, i.e. in the longitudinal direction of the holding part 1, and each is pivotably secured to holding part 1 below its support face 3 by a connecting web 4.

In this embodiment, support steps 2 have a bearing leg 5 that projects out from holding part 1, and a support leg 6 which is integrally connected to the front end of bearing leg 5 and from there extends downwardly and inwardly on in incline as far as connecting web 4. Support steps 2 have correspondingly sized recesses 7 in holding part 1, into which recesses the support steps 2 can be fully pressed in when a window pane 13 is pressed into position. However, only those support steps 2 whose faces 3 are located above the lower edge 15 of window pane 13 after its positioning in the transverse frame 11 are pressed in. The other support steps 2 remain in their initial position, and of these remaining support steps 2, the top most one carries out the support function as shown in FIG. 4.

Support steps 2 each have at the lower end of support leg 6, a downwardly directed stop face 8 at a distance "a" next to and in front of connecting web 4. Likewise, a support cam 10 which extends up to just under the stop face 8 is formed on the bottom 9 of the recesses 7 at the safe distance "a". The cam supports the stop face 8 in the pivoted-out and loaded state of the support step 2, so that the respective support step 2 is held in a stable position.

To remove the holding device, to be manufactured from plastic, from a mold in a manner which is easier in terms of casting technology, support cams 10 are each arranged in the middle of its associated support leg 6 and extend over approximately half the width of the support leg 6 as shown in FIG. 1. Thus connecting webs 4, which connect the support leg 6 to the holding part 1 in a pivotable manner, are preferably provided on either side of support cam 10, these connecting webs 4 being integrally connected to the bottom 9 of the recesses 7 a distance "a" offset from the support cams 10.

Figure 3:
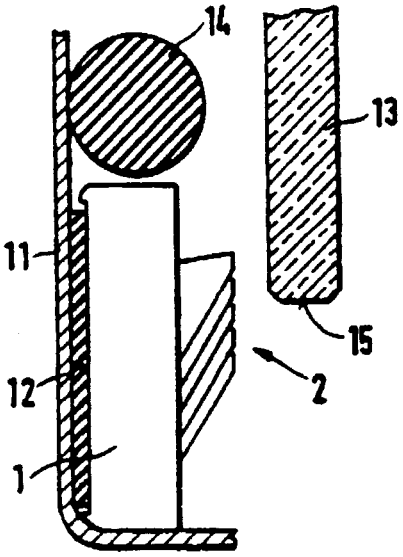
FIG. 3 shows the holding device installed in a window frame with a window pane before it has been pressed into position.
Figure 4:
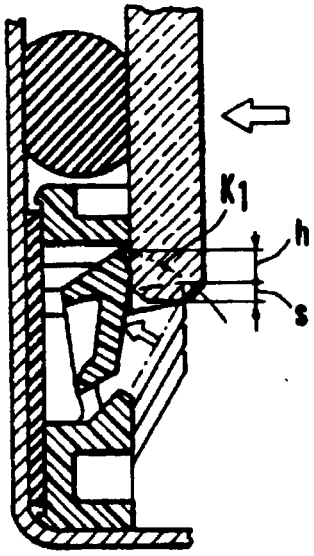
FIG. 4 shows, in section, the installed holding device generally taken along the line IV—IV in FIG. 1 after the window pane has been pressed into position.
Figure 5:
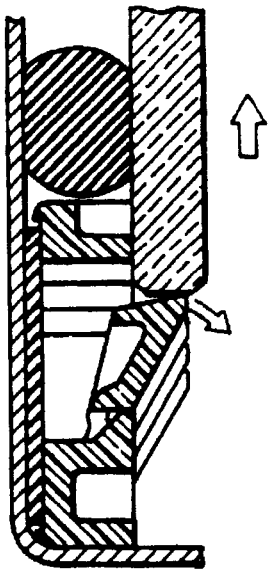
FIG. 5 shows the same installation after realignment of the window pane upwards in the direction of the arrow.
Figure 6:
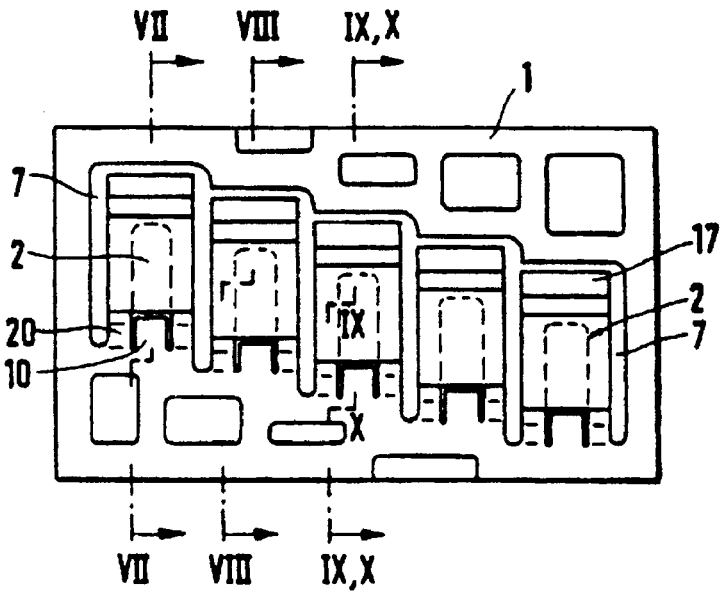
FIG. 6 is a front view of a further embodiment of the holding device of the invention.

The operation and function of the holding device is illustrated in FIGS. 3 to 5.

At least two holding devices are inserted in the lower transverse frame 11 of a customary automobile window frame (not illustrated in greater detail) and secured by means of a double-sided adhesive tape 12. As shown in FIG. 3, the support steps 2 are all in their pivoted-out initial position. An adhesive strip 14 used for permanently bonding the windshield 13 in the frame is located above the holding device. The windshield 13 is brought into place by a free arm robot (not illustrated) and positioned in front of the window frame.

FIG. 4 shows the assembly after the window pane 13 has been pressed into position in the direction of the arrow. The lower edge 15 of the window pane in this case is supported on the third lowest support step 2 and held by the latter in position for bonding to strip 14. The support step 2 immediately above it that is located along the section line IV—IV will have been pressed inwardly into its recess 7 by the window pane 13, as would the uppermost support step above that not shown in FIG. 4.

If it becomes apparent after pressing window pane 13 into position that in order for it to reach its correct position in the frame, the pane needs to be aligned slightly upwards (FIG. 5), the next highest support step (illustrated with hatching), will automatically pivot forwards or spring back into its initial position as the pane is moved upward and will now be under the edge 15 of the window pane due to the restoring force of its elastic connecting web 4. This will occur as soon as the lower edge 15 of the window pane has been moved upwards by a distance "s" in addition to the height "h" of the arc "K1" described by the pivoting movement of a support step. On the other hand, if the window pane 13 has to be pushed downwards during alignment, it is merely necessary for the support step then supporting the pane to be pressed inwards into its recess 7, whereby the window pane 13 will slide down and rest on the next lowest support step under its own weight.

In the embodiment shown in FIGS. 6–10, the holding device here also has five pivotally formed-on support steps 2 in the holding part 1 as in the previously described embodiment. However, here an upwardly angled stop nose 17 is provided at the rear end 16 of the bearing legs 5 of each support step 2. In the as-delivered state, they sit in the recess 7 and when the window pane 13 is in the supported position, they rest against its surface. In addition, the support steps 2 are pivotally connected to the holding part 1 via S-shaped connecting webs 20 (see FIGS. 8 snd 9). The points of connection of the connecting webs 20 to the steps 2 and the bottoms 9 of the recesses 7 extend out in front of the bearing face 19 of the holding part 1 (F1G. 8), as a result of which the arc "$K_2$" of bearing leg 5 as it pivots and the vertical distance "h" it travels is substantially less (FIG. 9) during pivoting than in the embodiment of FIGS. 1–5.

Support cams 10 are again provided having a support face 18 which projects out beyond bearing face 19 of holding part 1 by at least ½ of the thickness "d" of the window. As a result, this ensures that the support step 2 is supported via the support leg 6 in an extension of the plane of the window pane without the connecting webs 20 being loaded.

Figure 7:
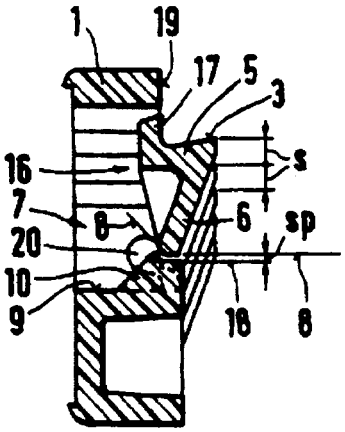
FIG. 7 is a sectional view through the top support step taken along the line VII—VII in FIG. 6.
Figure 8:
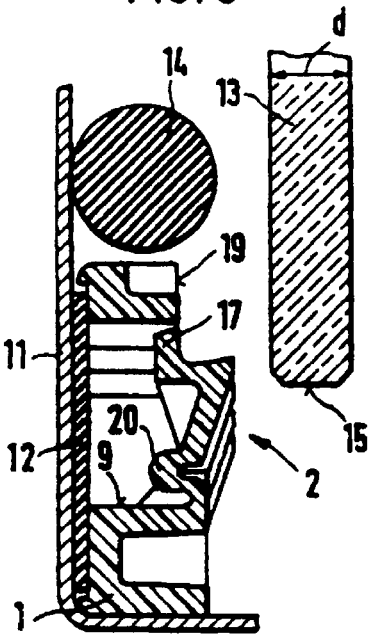
FIG. 8 shows, in section, the holding device of FIG. 6 installed in a window frame generally taken along the line VIII—VIII in FIG. 6, and with a window pane before it has been pressed into position.
Figure 9:
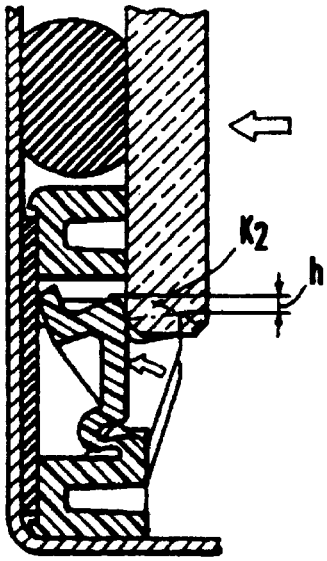
FIG. 9 shows, in section, the holding element generally taken along the line IX—IX in FIG. 6 after the window pane has been pressed into position.

However, the window frames 11 of front and rear windows of motor vehicles are usually inclined obliquely. Therefore, it is advisable in view of the flexible construction of the connecting webs 20 and the expected occurrence of transverse forces at the lower support leg 6, to allow the part of the support face 18 which lies in the recess 7 to incline upwardly at an oblique angle with respect to the projecting and supporting part of the face 18 of the support cam 10 to compensate for this inclined position. Of course, the stop face 8 of the support leg 6 must then also be angled to the same degree (FIG. 7).

Figure 10:
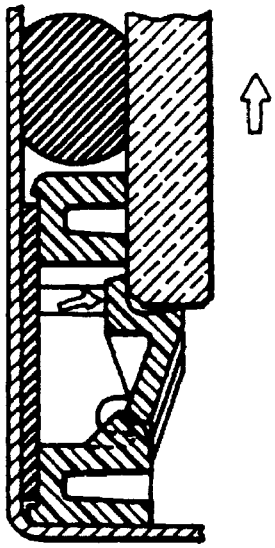
FIG. 10 shows the same installation after realignment of the window pane upwards in the direction of the arrow.
Figure 11:
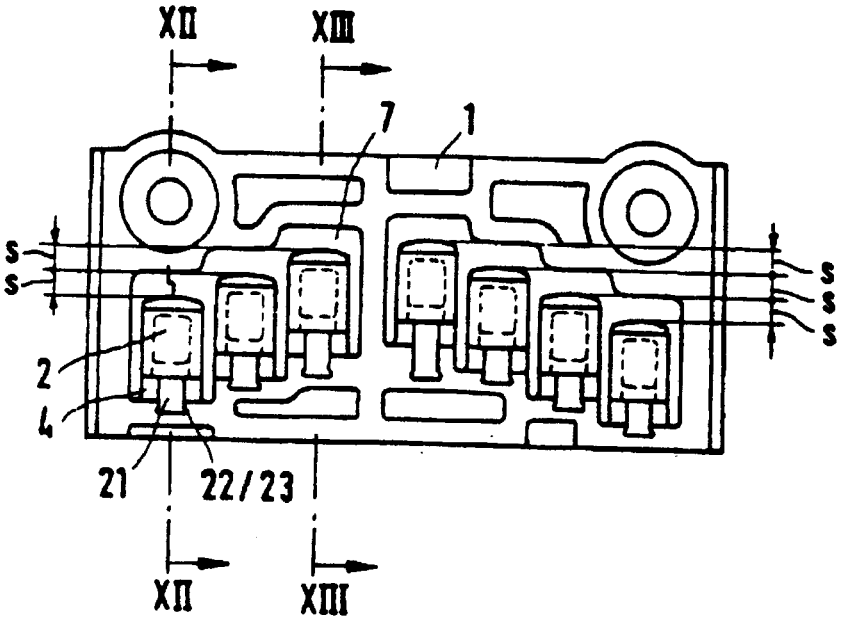
FIG. 11 is a front view of yet a further embodiment of the holding device of the invention.
Figure 12:
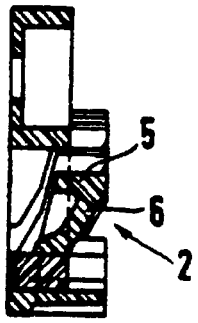
FIG. 12 is a sectional view through a lower support step taken along the line XII—XII in FIG. 11.

FIG. 10 shows the installation situation after upward alignment of the window pane 13, in which case the previously pressed-in support step will spring back towards the outside, exactly as in the installation situation already discussed with reference to FIG. 5. It will then lie under the edge 15 of the window pane as a result of the restoring force of its flexible connecting web 20. When the edge 15 of the window pane is supported by the bearing leg 6 of the step, the gap "sp", which is there initially due to manufacturing reasons between the two support faces 8 and 18 (FIG. 7), will disappear under the weight of the window pane so that the two support faces will then rest flush against each other. The support step will now be in a position to hold the window pane in a stable position while adhesive strip 14 sets.

In the embodiment shown in FIGS. 11–14, the holding device is equipped with seven support steps 2 which are in principle of identical construction and pivotally connected to the holding part 1 like the support steps 2 in the first embodiment. The essential difference lies in the fact that the support steps 2 are supported freely in the pivoted-out position.

Instead of a support cam 10, a support pin 21 is provided which is displaceably guided in the bottom 9 of the recesses 7 in a dovetail connection. This means that a dovetail-shaped guide groove 22 is provided in the bottoms 9 of the recesses 7 and pins 21 are provided with a correspondingly shaped guide foot 23.

Figure 13:
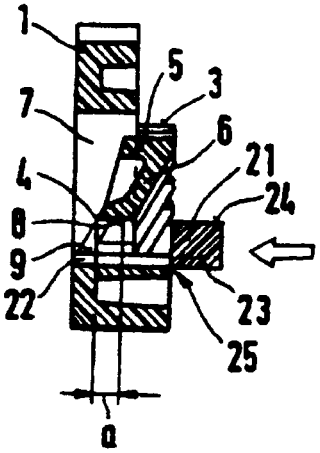
FIG. 13 is a sectional view through a higher support step taken along the line XIII—XIII in FIG. 11 with an injection-molded support pin in the as-delivered state.
Figure 14:
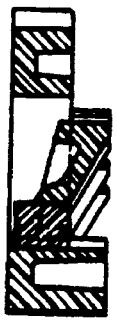
FIG. 14 is a sectional view similar to FIG. 13, but with the support pin forced into position.

As can be seen from FIG. 13, the support pins are initially formed on the side of the support steps 2 at the end of the guide groove 22 and are connected to the guide grooves 22 via tear-off connecting webs 25. After the preforms cools, the support pins are then pushed in the direction of the arrow into their position of use, the support face 24 of the support pin 21 sliding under the stop face 8 of the support step 2. The support steps 2 are thus supported in such a way that they remain in their support position without giving elastically when a window pane is placed on them and only the support steps 2 which are situated too high are pressed away into their recesses 7.

What is claimed is:

1. A holding device for vertically positioning a *window* pane in the window frame of a motor vehicle to allow it to be bonded thereto, comprising a holding part adapted to be inserted into a lower horizontal part of the frame and a series of support steps transversely spaced in a direction parallel to said frame part, each of said steps being integrally connected to the holding part by a flexible connecting web permitting the steps to pivot between a holding position where they extend forward of the holding part and an out-of-the-way position where they are located in a recess in said holding part, said steps being resiliently biased toward the holding position and each having an upper support face for supporting a lower edge of said window pane when in the holding position, the support faces of the steps being vertically spaced from each other an equal distance and a lower stop face that engage with a support cam on the holding part to support the step in its holding position.

2. The holding device of claim 1, wherein the support steps each having a bearing leg that projects outwardly of the holding part approximately perpendicular thereto when the step is in its holding position, said upper support face being located on the forward end of said bearing leg, and a support leg integrally connected to the forward end of the bearing leg and extending downwardly and inwardly toward said holding part, said lower stop faces being located on the lower end of said support legs and said connecting webs being connected to the support legs of each of the support [legs] *steps*.

3. The holding device of claim 2, wherein the lower stop faces extent obliquely relative to the support legs and are located at the lower end of the support legs a distance from the point where the connecting webs join the holding part, said support cams being located on the bottom of the recesses for the steps and at the same distance from said point.

4. The holding device of claim 3, wherein the support cams are located in the center of tie support legs and extend over approximately half the width of the support legs, a connecting web being located on either side of each support cam to pivotally connect each step to the holding part.

5. The holding device of claim 2, wherein an angled stop nose is provided on the rear end of the bearing legs of the support steps, which stop nose rests against an inside surface of the window pane when said window pane is supported by the step in the holding position.

6. The holding device of claim 5, wherein the support cam has a support surface for supporting the lower stop face of the steps which projects forward of the front side of the holding part by at least ½ of the thickness of the window pane, an inside surface of the window pane resting against the front side of the holding part when its lower edge is being held by a support step, and wherein connecting webs of S-shaped construction are located on either side of this projecting support surface to connect each step to the holding part.

7. The holding device of claim 6, wherein the part of the support surface of the support cam projecting forwardly of the front side of the holding part forms an oblique angle and the stop faces on the lower ends of the support legs form a similar angle.

8. The holding device of claim 2, wherein the stop faces extend obliquely relative to the support legs and are provided at the lower ends of the support legs a distance from the point where the connecting webs join the holding part, each of said support cams being located on a pin displaceably guided in the bottom of each of the recesses, said pin having an upper support surface compatible with said stop faces and being adapted to be pushed in toward said holding part to support the step in the holding position.

9. The holding device of claim 9, wherein the pin has a guide foot slidably mounted in a dovetail-shaped guide groove in the holding part and is molded integrally with the device by connecting tear-off webs.

10. The holding device of claim 1, wherein the support faces of the steps are all at a different level vertically and are arranged in stepped order in said transverse direction.

*11. A holding device for vertically positioning a window pane in the window frame of a motor vehicle to allow it to be bonded thereto, comprising a holding part adapted to be inserted into a lower horizontal part of the frame and a series of support steps transversely spaced in a direction parallel to said frame part, each of said steps being integrally connected to the holding part by a flexible connecting web permitting the steps to pivot between a holding position where they extend forward of the holding part and an out-of-the-way position where they are located in a recess in said holding part, said steps being resiliently biased toward the holding position and each having an upper support face for supporting a lower edge of said window pane when in the holding position, the support faces of the steps being vertically spaced from each other an equal distance, and a lower stop face that engages with a support member on the holding part to support the step in its holding position.*

*12. The holding device of claim 11, wherein the support steps each having a bearing leg that projects outwardly of the holding part approximately perpendicular thereto when the step is in its holding position, said upper support face being located on the forward end of said bearing leg, and a support leg integrally connected to the forward end of the bearing leg and extending downwardly and inwardly toward said holding part, said lower stop faces being located on the lower end of said support legs and said connecting webs being connected to the support legs of each of the support steps.*

*13. The holding device of claim 12, wherein the lower stop faces extend obliquely relative to the support legs and are located at the lower end of the support legs a distance from the point where the connecting webs join the holding part, said support members being located on the bottom of the recesses for the steps and at the same distance from said point.*

*14. The holding device of claim 13, wherein the support members are located in the center of the support legs and extend over approximately half the width of the support legs, a connecting web being located on either side of each support member to pivotally connect each step to the holding part.*

*15. The holding device of claim 12, wherein an angled stop nose is provided on the rear end of the bearing legs of the support steps, which stop nose rests against an inside surface of the window pane when said window pane is supported by the step in the holding position.*

*16. The holding device of claim 15, wherein the support member has a support surface for supporting the lower stop face of the steps which projects forward of the front side of the holding part by at least ⅓ of the thickness of the window pane, an inside surface of the window pane resting against the front side of the holding part when its lower edge is being held by a support step, and wherein connecting webs of S-shaped construction are located on either side of this projecting support surface to connect each step to the holding part.*

*17. The holding device of claim 16, wherein the part of the support surface of the support member projecting forwardly of the front side of the holding part forms an oblique angle and the stop faces on the lower ends of the support legs form a similar angle.*

*18. The holding device of claim 12, wherein the stop faces extend obliquely relative to the support legs and are provided at the lower ends of the support legs a distance from the point where the connecting webs join the holding part, each of said support members comprising a pin displaceably guided in the bottom of each of the recesses, said pin having an upper support surface compatible with said stop faces and being adapted to be pushed in toward said holding part to support the step in the holding position.*

*19. The holding device of claim 19, wherein the pin has a guide foot slidably mounted in a dovetail-shaped guide groove in the holding part and is molded integrally with the device by connecting tear-off webs.*

*20. The holding device of claim 11, wherein the support faces of the steps are all at a different level vertically and are arranged in stepped order in said transverse direction.*

* * * * *

UNITED STATES PATENT AND TRADEMARK OFFICE

CERTIFICATE OF CORRECTION

PATENT NO. : RE. 35,719

DATED : February 3, 1998

INVENTOR(S) : Hans-Jürgen Lesser et al.

It is certified that error appears in the above-indentified patent and that said Letters Patent is hereby corrected as shown below:

Claim 1, col. 5, line 59, "engage" should read --engages--.

Claim 3, col. 6, line 5, "extent" should read --extend--.

Claim 9, col. 6, line 44, "claim 9" should read --claim 8--.

Claim 19, col. 8, line 23, "claim 19" should read --claim 18--.

Signed and Sealed this

First Day of December, 1998

*Attest:*

*Attesting Officer*

BRUCE LEHMAN

*Commissioner of Patents and Trademarks*